(12) United States Patent
Holz et al.

(10) Patent No.: US 8,276,559 B2
(45) Date of Patent: Oct. 2, 2012

(54) METHOD AND DEVICE FOR THE OPTIMIZED STARTING OF AN INTERNAL COMBUSTION ENGINE

(75) Inventors: Matthias Holz, Lehre (DE); Michael Zillmer, Sickte (DE); Ekkehard Pott, Gifhorn (DE); David Prochazka, Libosovice (CZ)

(73) Assignee: Volkswagen AG, Wolfsburg (DE)

( * ) Notice: Subject to any disclaimer, the term of this patent is extended or adjusted under 35 U.S.C. 154(b) by 805 days.

(21) Appl. No.: 11/794,556

(22) PCT Filed: Dec. 8, 2005

(86) PCT No.: PCT/EP2005/013138
§ 371 (c)(1),
(2), (4) Date: Jan. 14, 2010

(87) PCT Pub. No.: WO2006/069620
PCT Pub. Date: Jul. 6, 2006

(65) Prior Publication Data
US 2010/0108009 A1 May 6, 2010

(30) Foreign Application Priority Data
Dec. 28, 2004 (DE) .......................... 10 2004 062 939

(51) Int. Cl.
*F02N 11/08* (2006.01)
(52) U.S. Cl. ........... 123/179.3; 123/179.15; 123/179.25; 123/179.28
(58) Field of Classification Search ............. 123/179.25, 123/179.28, 179.3, 179.13, 179.15; 701/113; 73/114.23, 114.58, 114.59
See application file for complete search history.

(56) References Cited

U.S. PATENT DOCUMENTS

| | | | |
|---|---|---|---|
| 5,642,696 | A | 7/1997 | Matsui |
| 6,202,615 | B1 | 3/2001 | Pels |

(Continued)

FOREIGN PATENT DOCUMENTS

DE 196 01 241 7/1996

(Continued)

OTHER PUBLICATIONS

International Preliminary Report on Patentability and Written Opinion, International Patent Application No. PCT/EP2005/013138, dated Jul. 3, 2007 (English-language translation provided). International Search Report, International Patent Application No. PCT/EP2005/013138, dated Mar. 16, 2006.

*Primary Examiner* — Hai Huynh
(74) *Attorney, Agent, or Firm* — Kenyon & Kenyon LLP

(57) ABSTRACT

A method and a device are for the optimized starting of an internal combustion engine using a starter, which is connected to a capacitor store, the capacitor store being connected via a DC/DC converter to a vehicle electrical system of a vehicle, and the vehicle electrical system including an energy store for supplying electrical energy having a nominal voltage, and the starter consuming a starting energy for starting the internal combustion engine, which is a function of a temperature of the internal combustion engine, the temperature of the internal combustion engine being measured by at least one temperature sensor and the capacitor store being charged to a setpoint voltage with the aid of a battery via another DC/DC converter, which connects the battery in parallel to the capacitor store parallel to a switch, the setpoint voltage being set by a control unit such that the electrical energy stored in the capacitor store charged to the setpoint voltage is greater than the starting energy ascertained on the basis of the measured temperature.

21 Claims, 2 Drawing Sheets

U.S. PATENT DOCUMENTS

| | | | |
|---|---|---|---|
| 6,320,274 B1 | 11/2001 | Goetze et al. | |
| 6,453,863 B1 | 9/2002 | Pels et al. | |
| 6,713,894 B1 | 3/2004 | Reimer et al. | |
| 6,904,342 B2 * | 6/2005 | Hanada et al. | 701/22 |
| 7,319,306 B1 * | 1/2008 | Rydman et al. | 320/166 |
| 2003/0139859 A1 | 7/2003 | Hanada et al. | |
| 2003/0140880 A1 | 7/2003 | Kahlon et al. | |
| 2004/0124811 A1 | 7/2004 | Kok et al. | |
| 2004/0140139 A1 | 7/2004 | Malik | |
| 2009/0024265 A1 * | 1/2009 | Kortschak et al. | 701/22 |

FOREIGN PATENT DOCUMENTS

| | | |
|---|---|---|
| DE | 197 09 298 | 9/1998 |
| DE | 198 09 399 | 2/1999 |
| DE | 197 52 661 | 6/1999 |
| DE | 103 04 632 | 8/2003 |
| EP | 1 073 842 | 11/2002 |
| EP | 0 964 995 | 2/2003 |
| EP | 1 309 064 | 5/2003 |
| EP | 1 424 494 | 6/2004 |

* cited by examiner

METHOD AND DEVICE FOR THE OPTIMIZED STARTING OF AN INTERNAL COMBUSTION ENGINE

FIELD OF THE INVENTION

The present invention relates to a method and a device for the optimized starting of an internal combustion engine.

BACKGROUND INFORMATION

Vehicles having an internal combustion engine have a starter. The starter may take the form of a conventional starter, a belt-driven starter-generator or a crankshaft starter-generator. The starter in each case includes an electric machine which turns a crankshaft of the internal combustion engine for starting. The electrical energy required for driving the electric machine of the starter is drawn from an electrical energy store. The energy store is normally a battery, which is also responsible for supplying an electrical system of the vehicle. The starting power or starting energy required for starting the internal combustion engine depends on a temperature of the internal combustion engine. At low temperatures, the required starting energy is greater than at higher temperatures due to a higher static friction and greater oil viscosity. Additionally, a maximally drawable discharging current decreases, particularly in a battery that is not fully charged or that has already aged. As a result, the starting reliability of conventional vehicles diminishes at low temperatures.

In order to increase the starting reliability, German Published Patent Application No. 196 01 241 describes a capacitor store connected parallel to the battery. This is charged prior to starting the internal combustion engine. A capacitor store has a lower internal resistance than a battery and is therefore able to provide large discharge currents during the starting operation nearly irrespective of temperature. A disadvantage of the device is that the capacitor store can only be charged to the voltage of the vehicle electrical system battery, which normally amounts to 14 V.

Alternatively, German Published Patent Application No. 197 52 661 describes a so-called intermediate circuit capacitor, which is connected to the vehicle electrical system via a DC/DC converter. This intermediate circuit capacitor is charged to a voltage of approximately 400 V. In the process, the low voltage limit of approximately 60 V is clearly exceeded such that costly insulating measures are required as shock hazard protection.

In both conventional devices, the vehicle electrical system supply is drawn upon to provide the starting energy such that a load is placed on the energy store of the vehicle electrical system.

SUMMARY

Example embodiments of the present invention provide a method and a device for the optimized starting of an internal combustion engine, which improve a starting reliability, particularly at low temperatures.

For this purpose, the temperature of the internal combustion engine is measured by at least one temperature sensor and the capacitor store is charged to a setpoint voltage with the aid of a battery via another DC/DC converter, which connects the battery in parallel to the capacitor store parallel to a switch, the setpoint voltage being set by a control device such that the electrical energy stored in the capacitor store charged to the setpoint voltage is greater than the starting energy for one or more starting operations ascertained on the basis of the measured temperature. This ensures, on the one hand, that there is always a sufficient amount of energy stored in the capacitor store to guarantee that the starter is able to start the internal combustion engine reliably. Moreover, the energy required for starting is not drawn from the energy store of the vehicle electrical system, but from an additional battery, which is connected in parallel to the capacitor via the additional DC/DC converter. This avoids an additional load on the energy store of the vehicle electrical system when starting the internal combustion engine, particularly also at low temperatures. A high load, i.e., a large power draw from a battery, accelerates the battery's aging process. Since these high loads on the energy store of the vehicle electrical system during the starting operation are avoided, the service life of the energy store of the vehicle electrical system is extended.

A finite time (e.g., limited by the output of the DC/DC converter) is required for charging the capacitor store. An example embodiment of the present invention therefore provides for at least one event sensor to register at least one event, in particular an unlocking of a central locking system, an insertion of an ignition key into an ignition lock, a loading of a driver seat, a switching-on of a seat heater, and for a state of the battery and the capacitor store to be ascertained and for the capacitor store to be charged, temporally speaking, a period of time after the registration of the at least one event, the period of time being determined as a function of the state of the battery and the state of the capacitor store. That is, the capacitor store is charged after at least one event has been registered by at least one of the event sensors. One of the events normally precedes a starting of the internal combustion engine in close temporal proximity. If one or more of these events are registered, then the capacitor is charged. This allows a driver subsequently to start the internal combustion engine at any time without delay. This signifies an increased ease of operation of the vehicle.

An example embodiment of the present invention provides for the voltage of the capacitor store to be ascertained by a voltage sensor and for the capacitor store to be charged to a maximum hysteresis voltage, which is greater than the setpoint voltage by a freely applicable delta, as soon as the voltage of the capacitor store falls below a minimum hysteresis voltage, which is smaller than the setpoint voltage by another freely applicable delta. In this example embodiment, the required starting energy is approximately always stored in the capacitor store. Since in a capacitor store, however, there is always a voltage drop due to self-discharge, it is necessary to recharge the capacitor store from time to time. The length of the time interval for recharging is determined by the freely applicable delta or by the freely applicable additional delta. If it is to be ensured that at any time at least the required starting energy for one or multiple starting operations exists in the capacitor store, the additional delta may be set to zero. In this case, the capacitor store is charged from time to time to the maximum hysteresis voltage, which is above the setpoint voltage. As soon as the voltage has again dropped to the setpoint voltage, the capacitor store is in this case charged anew to the maximum hysteresis voltage. In this case, the minimum hysteresis voltage corresponds to the setpoint voltage.

An error in the operation of the vehicle may cause a so-called stalling of the internal combustion engine such that immediately following the starting of the internal combustion engine another start of the internal combustion engine is required. For this reason, an example embodiment of the present invention provides for the setpoint voltage to be established such that the electrical energy stored in the capacitor store charged to the setpoint voltage suffices to be able to perform a predefined number of starting operations of the internal combustion engine at the measured temperature, and that, following the performance of the predefined number of starting operations, the voltage on the capacitor store is greater than a battery voltage of the battery. The predefined number of starting operations may assume any value greater than or equal to one. For example, the predefined number of starting operations, for which an energy is stored in the capacitor store, will be two. This refinement additionally provides that, following the starting operation, the voltage on the capacitor store is still greater than the battery voltage. This avoids having to close the switch connecting in parallel the capacitor store and the battery so as to draw a part of the energy required for starting directly from the battery. A direct withdrawal results in a strong load on the battery, which would accelerate an undesired aging of the battery.

In particular, when the battery is no longer fully charged, it must be ensured that at least two starting operations can be performed using the energy stored in the capacitor store. For this reason, there may be the provision to increase the predefined number of starting operations to at least two when the charge state of the battery falls below a minimum charge state.

In addition to the energy store of the vehicle electrical system, the vehicle has a second energy store available to it in the form of the battery, which may be used to relieve a not fully functional or not fully loadable energy store of the vehicle electrical system. Hence, an example embodiment of the present invention provides for a charge state of the energy store of the vehicle electrical system to be ascertained and, in the event of a drop below a minimum charge state threshold, for the setpoint voltage to be established such that the capacitor store is able to supply additional energy into the vehicle electrical system via the DC/DC converter during the predefined number of starting operations, the minimum charge state threshold being a function of an aging state of the energy store.

The starting reliability of an example embodiment is additionally increased in that the capacitor store is charged at least partly via the DC/DC converter from the energy store of the vehicle electrical system if the charge state of the battery and/or the aging state of the battery have fallen below a respective charge and/or aging state threshold. This means that the capacitor store is charged via the DC/DC converter from the energy store of the vehicle electrical system if the battery is not able to charge the capacitor store at all or within a suitable time to the setpoint voltage.

An example embodiment of the present invention provides for the actual energy required for starting to be measured and stored and subsequently to be taken into account when establishing the setpoint voltage. Using this example embodiment, it is possible to determine that the energy actually required for starting the internal combustion engine was greater than the energy stored in the capacitor store, even though the latter was charged to the established setpoint voltage. In a subsequent starting operation, the capacitor store may be charged additionally by the amount of the difference, i.e., the setpoint voltage can be set higher. The amount of the difference corresponds to the energy that was drawn from the battery, in the preceding starting operation, in addition to the energy stored in the capacitor store. In this manner, cases will be very rare in which energy must be drawn from the battery in addition to the capacitor store when starting.

In order to charge the capacitor store as quickly as possible, an example embodiment of the present invention provides for a battery voltage of the battery to be greater than a nominal voltage of the energy store of the vehicle electrical system and for the capacitor store to be charged maximally to a voltage of approximately 60 V. A limitation of the voltage of the capacitor store to 60 V is advantageous because up to a voltage of 60 V no costly shock-hazard protection is necessary.

The method may be implemented particularly well if the capacitor store takes the form of an Ultracap.

The features of the device according to example embodiments of the present invention have the same advantages as the corresponding features of the method according to example embodiments of the present invention.

Example embodiments of the present invention are explained in more detail below with reference to the appended Figures.

DETAILED DESCRIPTION

Figure 1:
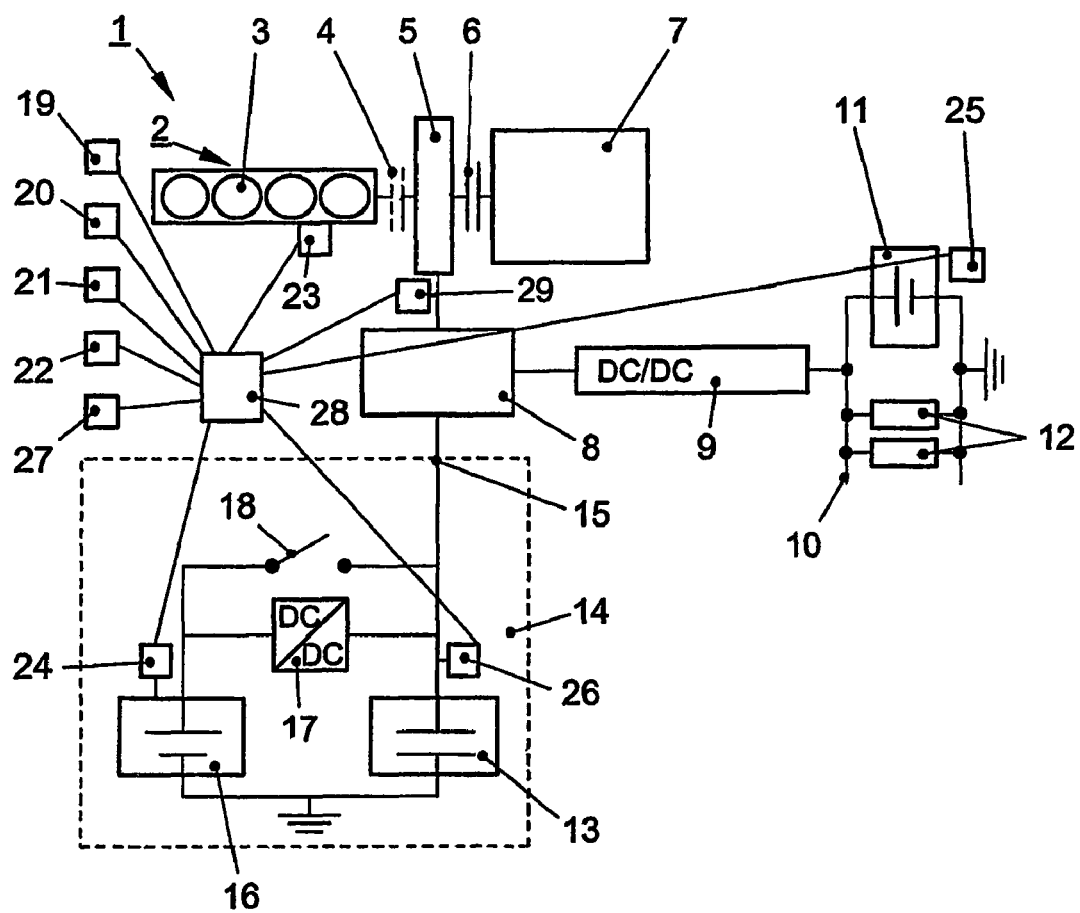
FIG. 1 is a schematic view of a vehicle.

FIG. 1 is a schematic view of a vehicle 1 having a drive system 2. Drive system 2 includes an internal combustion engine 3, which is connected via an optional clutch 4 to a starter, which takes the form of an electric machine 5. Electric machine 5 may be operated both as a generator and as a motor. Such a drive system 2 is referred to as a hybrid drive system. Electric machine 5 is connected via a vehicle clutch 6 and a vehicle transmission 7 to driven wheels of vehicle 1. A vehicle electrical system 10 is connected to electric machine 5 via a power electronics 8 and a DC/DC converter 9. Vehicle electrical system 10 includes an energy store, which takes the form of a low-voltage battery 11 having a nominal voltage of, 14 V. Low-voltage battery 11 supplies consumers 12 of the vehicle electrical system 10.

A capacitor store 13 of a hybrid energy store 14 is connected directly to power electronics 8 via a connection 15. Capacitor store 13 may take the form of an Ultracap. Hybrid energy store 14 furthermore includes a battery 16, which is connected electrically parallel to capacitor store 13 by an additional DC/DC converter 17 and a switch 18.

For the purpose of starting internal combustion engine 3, electric machine 5 is operated as a motor. The electrical energy required for this purpose is drawn from hybrid energy store 14. The vehicle includes event sensors for detecting or ascertaining events prior to a starting operation of internal combustion engine 3. The event sensors of vehicle 1 take the form of a sensor for detecting an unlocking of a central locking system 19, a contact sensor 20 for detecting a loading of a driver seat of vehicle 1, a key sensor 21 for detecting an insertion of an ignition key into an ignition lock and a current sensor 22 for detecting a switching-on of a seat heater. Vehicle 1 may include any additional or differently designed event sensors. Using these event sensors makes it possible to register activities of a driver that normally precede a starting operation in time.

At least one temperature sensor 23 is situated on internal combustion engine 3. With the aid of temperature sensor 23, it is possible to measure a temperature of internal combustion engine 3. A state sensor 24 provides information about the state of battery 16. This state information includes a charge state (SOC—state of charge) of battery 16, an aging state (SOH—state of health) of battery 16 and a battery voltage. Another state sensor 25, which is situated on low-voltage battery 11 of vehicle electrical system 10, ascertains accordingly a charge state, an aging state and a voltage of low-voltage battery 11. A voltage sensor 26, which is situated on capacitor store 13, is provided to ascertain a voltage of capacitor store 13. The vehicle also has an outside temperature sensor 27 for ascertaining an outside temperature.

A control device 28 receives the information and data ascertained and detected with the aid of the event sensors. Based on the temperature of internal combustion engine 3, a starting energy is ascertained that will be consumed by electric machine 5 to start internal combustion engine 3. Based on the starting energy thus ascertained, a setpoint voltage is established to which capacitor store 13 is to be charged in order to contain at least this starting energy. Subsequently, the system ascertains whether the voltage of capacitor store 13 is already equal to or greater than the setpoint voltage. In this case, a starting operation may be triggered immediately. Otherwise the system ascertains, by taking into account the charge state and aging state of battery 16 and the ascertained battery voltage, how long it will take to charge capacitor store 13 to the setpoint voltage via the additional DC/DC converter 17. As a function of the time thus ascertained, which is required to charge capacitor store 13, control unit 28 establishes upon which event, determined by the event sensors, the charging operation is to be triggered. Event combinations may be used as well. Other example embodiments may include other and additional event sensors for detecting the activities of the driver, which differ from the ones described here. It is also possible that the previous use of the vehicle is determined statistically and that the statistical data obtained thereby are used in order to set the time for charging capacitor store 13 to the setpoint voltage. It is also possible to evaluate information regarding the date, day of the week, and time of day for this purpose.

If control device 28 determines that the charge state or aging state of battery 16 are such that it is not possible to charge capacitor store 13 to the setpoint voltage in a suitable time, then the process of charging capacitor store 13 from low-voltage battery 11 via DC/DC converter 9 may be initiated.

On the other hand, if control device 28 determines that due to the charge state, the aging state and/or the voltage of low-voltage battery 11 a sufficient supply of consumers 12 of vehicle electrical system 10 is not sufficiently guaranteed in the event of a starting operation, then control device 28 sets the setpoint voltage such that capacitor store 13 during the starting operation is also able to supply electrical energy to vehicle electrical system 10 via DC/DC converter 9. This procedure may be advantageous at a charge state of less than 60%, even more advantageous at a charge state of less than 80% and particularly advantageous at a charge state of less than 90% of low-voltage battery 11.

If capacitor store 13 is charged to the setpoint voltage, then a driver may trigger the starting of the internal combustion engine. For this purpose, electric machine 5 is operated as a motor and rotates the crankshaft of internal combustion engine 3. If in the starting operation the voltage of capacitor store 13 falls to the battery voltage of battery 16, then switch 18 is closed in order to draw from battery 16 the additionally required energy for the starting operation. Such a load on battery 16 is to be avoided if possible. It accelerates the aging of battery 16, especially when the latter is not fully charged. Hence, there is a provision for control device 28 to increase the setpoint voltage to such a degree that capacitor store 13, if it is charged to the setpoint voltage, stores at least twice the starting energy that is required to start internal combustion engine 3. In addition, after performing two starting operations, the voltage on capacitor store 13 should still be greater than the battery voltage of battery 16. Such an increase of the setpoint voltage may be advantageous if the charge state of battery 16 is lower than 60%, advantageously lower than 80% and particularly advantageously lower than 90%. The aging state of battery 16 must be taken into account when making the precise determination of these thresholds. In addition, the outside temperature may be taken into account when determining the required starting energy.

The described example embodiment shown in FIG. 1 includes in each case in capacitor store 13, as a function of the temperature of internal combustion engine 3, a sufficient quantity of energy in order to be able to perform reliably at least one starting operation, e.g., two starting operations. The example embodiment further includes another current sensor 29, which ascertains an energy actually consumed during a starting operation. If control device 28 ascertains on the basis of this actually ascertained energy that it is greater than the previously ascertained starting energy, then this may be taken into account in the future in order to adapt the starting energy. This further reduces cases in which battery 16 is loaded during a starting operation because the energy stored in capacitor store 13 is not sufficient successfully to conclude the starting operation of internal combustion engine 3.

Figure 2:
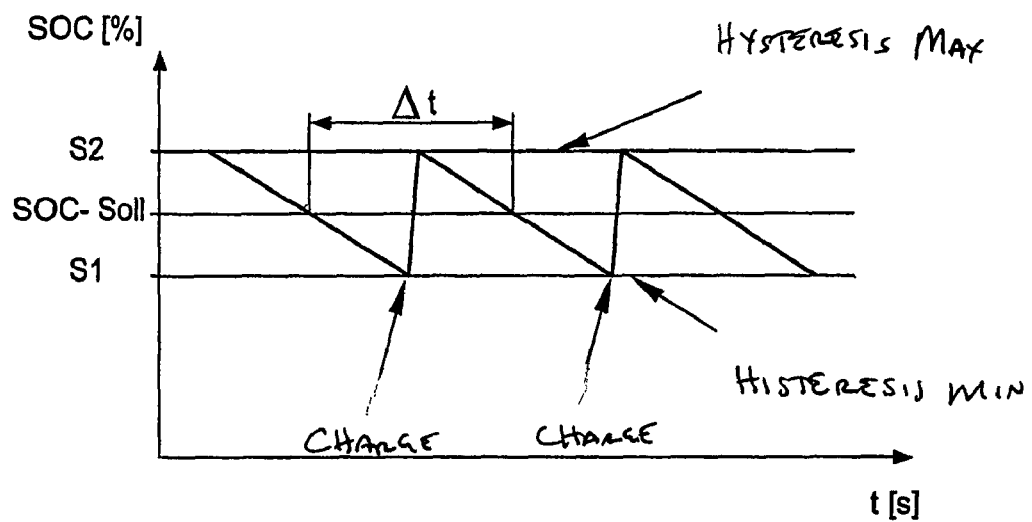
FIG. 2 is a graph of a charge state of a capacitor store plotted against time.

An alternative example embodiment provides for the voltage of the capacitor store always to be maintained approximately at the setpoint voltage. Since a self-discharge occurs in every capacitor store, the energy lost in the process must be added anew to the capacitor store by charging. So as to avoid a constant recharging, a provision is made to charge the capacitor store to a maximum hysteresis voltage and for a recharge to occur only when there is a drop below a minimum hysteresis voltage. In FIG. 2, a charge state of the capacitor store is plotted against time. A maximum charge state S2 corresponds to the maximum hysteresis voltage. A minimum charge state S1 corresponds to the minimum hysteresis voltage. A setpoint charge state is between charge state S1 and maximum charge state S2. The maximum hysteresis voltage or the maximum charge state is greater by a freely applicable delta than the setpoint charge state or the setpoint voltage. The minimum hysteresis voltage or the minimum charge state is lower by a freely applicable delta than the setpoint charge state or the setpoint voltage. The additional delta may be selected to equal zero. In this case, the capacitor store is in each instance charged to the maximum hysteresis voltage and already charged anew when dropping below the setpoint voltage. The time interval between two charging operations $\Delta t$ is determined by the choice of the delta and of the additional delta as well as by the self-discharge characteristic of the capacitor store.

All in all, the described example embodiments ensure that the internal combustion engine may always be reliably started, even at low temperatures. Furthermore, a low-voltage battery of the vehicle electrical system is not loaded during the starting operation. If the charge state of the low-voltage battery of the vehicle electrical system is poor, then it is even reinforced by energy from the capacitor store during the starting operation. This additionally ensures a reliable supply of all consumers of the vehicle electrical system during the starting operation.

What is claimed is:

1. A method for optimized starting of an internal combustion engine with a starter, which is connected to a capacitor store, the capacitor store connected via a first DC/DC converter to a vehicle electrical system of a vehicle, the vehicle electrical system including an energy store for supplying electrical energy having a nominal voltage, and the starter consuming a starting energy for starting the internal combustion engine, which is a function of a temperature of the internal combustion engine, comprising:

measuring the temperature of the internal combustion engine by at least one temperature sensor;
charging the capacitor store to a setpoint voltage by a battery via a second DC/DC converter, which connects the battery in parallel to the capacitor store parallel to a switch;
setting the setpoint voltage by a control device such that the electrical energy stored in the capacitor store charged to the setpoint voltage is greater than the starting energy ascertained on the basis of the measured temperature.

2. The method according to claim 1, further comprising:
registering at least one event by at least one event sensor, the at least one event including: (a) an unlocking of a central locking system; (b) an insertion of an ignition key into an ignition lock; (c) a loading of a driver seat; and/or (d) a switching-on of a seat heater;
ascertaining a state of the battery and of the capacitor store; and
determining a period of time as a function of the state of the battery and the state of the capacitor store;
wherein the capacitor is charged in the charging step for the period of time after registration of the at least one event.

3. The method according to claim 2, wherein the setpoint voltage is established such that the electrical energy stored in the capacitor store charged to the setpoint voltage is sufficient to perform a predefined number of starting operations of the internal combustion engine at the measured temperature, and that, following performance of the predefined number of starting operations, the voltage on the capacitor store is greater than a battery voltage of the battery.

4. The method according to claim 3, wherein the state of the battery includes a charge state and the predefined number of starting operations is increased to at least two if the charge state of the battery falls below a minimum charge state.

5. The method according to claim 3, further comprising:
ascertaining a charge state of the energy store of the vehicle electrical system; and
in the event of a drop below a minimum charge state threshold, establishing the setpoint voltage such that the capacitor store is able to supply additional energy into the vehicle electrical system via the first DC/DC converter during the predefined number of starting operations, the minimum charge state threshold being a function of an aging state of the energy store.

6. The method according to claim 5, further comprising charging the capacitor store at least partly via the first DC/DC converter from the energy store of the vehicle electrical system if (a) the charge state of the battery has fallen below a charge state threshold and/or (b) the aging state of the battery has fallen below an aging state threshold.

7. The method according to claim 1, further comprising:
ascertaining a voltage of the capacitor store by a voltage sensor; and
charging the capacitor store to a maximum hysteresis voltage, which is greater than the setpoint voltage by a first freely applicable delta, as soon as the voltage of the capacitor store falls below a minimum hysteresis voltage, which is smaller than the setpoint voltage by a second freely applicable delta.

8. The method according to claim 1, further comprising:
measuring and storing an actual energy required for starting; and
establishing the setpoint voltage at least on accordance with the actual energy required for starting.

9. The method according to claim 1, wherein a battery nominal voltage of the battery is greater than a nominal voltage of the energy store of the vehicle electrical system, and wherein the capacitor store is charged in the charging step maximally to a voltage of approximately 60 V.

10. The method according to claim 1, wherein the capacitor store is configured as an Ultracap.

11. A device for optimized starting of an internal combustion engine, comprising:
a starter;
a first DC/DC converter;
a capacitor store, the starter connected to the capacitor store, the capacitor store connected to a vehicle electrical system of a vehicle via the first DC/DC converter, the vehicle electrical system including an energy store for supplying electrical energy having a nominal voltage, the starter consuming a starting energy to start the internal combustion engine as a function of a temperature of the internal combustion engine,
at least one temperature sensor configured to measure the temperature of the internal combustion engine;
a battery configured to charge the capacitor store to a setpoint voltage via a second DC/DC converter, which connects the battery in parallel to the capacitor store parallel to a switch; and
a control device configured to set the setpoint voltage such that electrical energy stored in the capacitor store charged to the setpoint voltage is greater than the starting energy ascertained on the basis of the measured temperature.

12. The device according to claim 11, further comprising:
at least one event sensor configured to register at least one event, the at least one event including: (a) an unlocking of a central locking system; (b) an insertion of an ignition key into an ignition lock; (c) a loading of a driver seat; and/or (d) a switching-on of a seat heater; and
state sensors configured to determine a state of the battery and a state of the capacitor store;
wherein charge of the capacitor store is effectable a period of time after registration of the at least one event, the period of time determinable as a function of the state of the battery and the state of the capacitor store.

13. The device according to claim 11, further comprising a voltage sensor configured to ascertain a voltage of the capacitor store, the capacitor store chargeable to a maximum hysteresis voltage, which is greater than the setpoint voltage by a first freely applicable delta, as soon as the voltage of the capacitor store falls below a minimum hysteresis voltage, which is smaller than the setpoint voltage by a second freely applicable delta.

14. The device according to claim 11, wherein the control device is configured to set the setpoint voltage such that the electrical energy stored in the capacitor store charged to the setpoint voltage is sufficient to perform a predefined number of starting operations of the internal combustion engine at the measured temperature, and, following the performance of the predefined number of starting operations, the voltage on the capacitor store is greater than a battery voltage of the battery.

15. The device according to claim 11, further comprising a device configured to ascertain a charge state of the energy store of the vehicle electrical system and a device configured to determine a drop below a minimum charge state threshold, the control device configured to set the setpoint voltage in accordance with the drop below the minimum charge state threshold such that the capacitor store is able to supply additional energy into the vehicle electrical system via the first DC/DC converter during the predefined number of starting operations, the minimum charge state threshold being a function of an aging state of the energy store.

16. The device according to claim 15, wherein the predefined number of starting operations is increased to at least two if the charge state of the battery falls below a minimum charge state.

17. The device according to claim 11, further comprising a device configured to detect (a) a charge state of the battery, (b) a battery temperature, (c) an aging state of the battery and/or (d) a vehicle outside temperature, the control device configured to set the setpoint voltage in accordance with (a) the charge state of the battery, (b) the battery temperature, (c) the aging state of the battery and/or (d) the vehicle outside temperature.

18. The device according to claim 11, wherein the capacitor store is chargeable at least partly via the first DC/DC converter from the energy store of the vehicle electrical system if (a) a charge state of the battery falls below a charge state threshold and/or (b) an aging state of the battery falls below an aging state threshold.

19. The device according to claim 11, further comprising:
a device configured to measure an energy actually required for starting; and
a memory configured to store the actually required energy;
wherein the control device is configured to set the setpoint voltage in accordance with the actually required energy.

20. The device according to claim 11, wherein a battery nominal voltage of the battery is greater than a nominal voltage of the energy store of the vehicle electrical system and the capacitor store is configured for a maximum voltage of approximately 60 V.

21. The device according to claim 11, wherein the capacitor store is configured as an Ultracap.

\* \* \* \* \*